M. E. BLOOD.
UNIVERSAL JOINT.
APPLICATION FILED MAY 17, 1916.
1,216,769.
Patented Feb. 20, 1917.
2 SHEETS—SHEET 1.
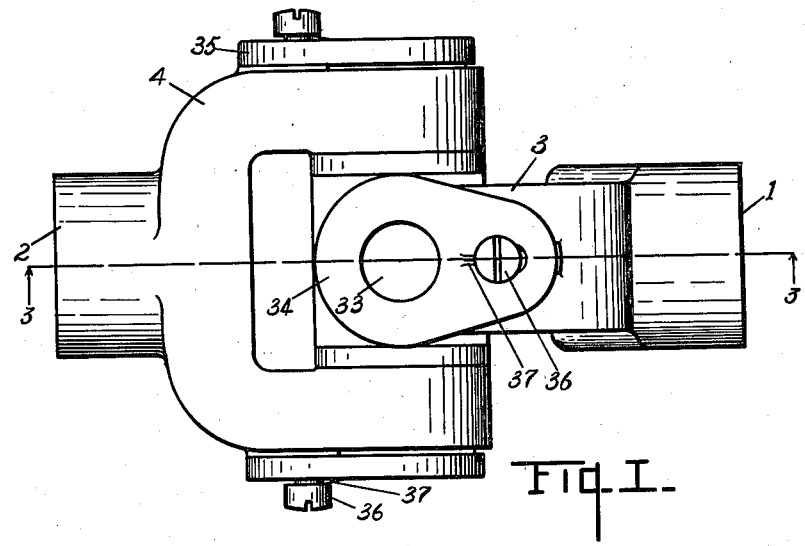
Fig. I.
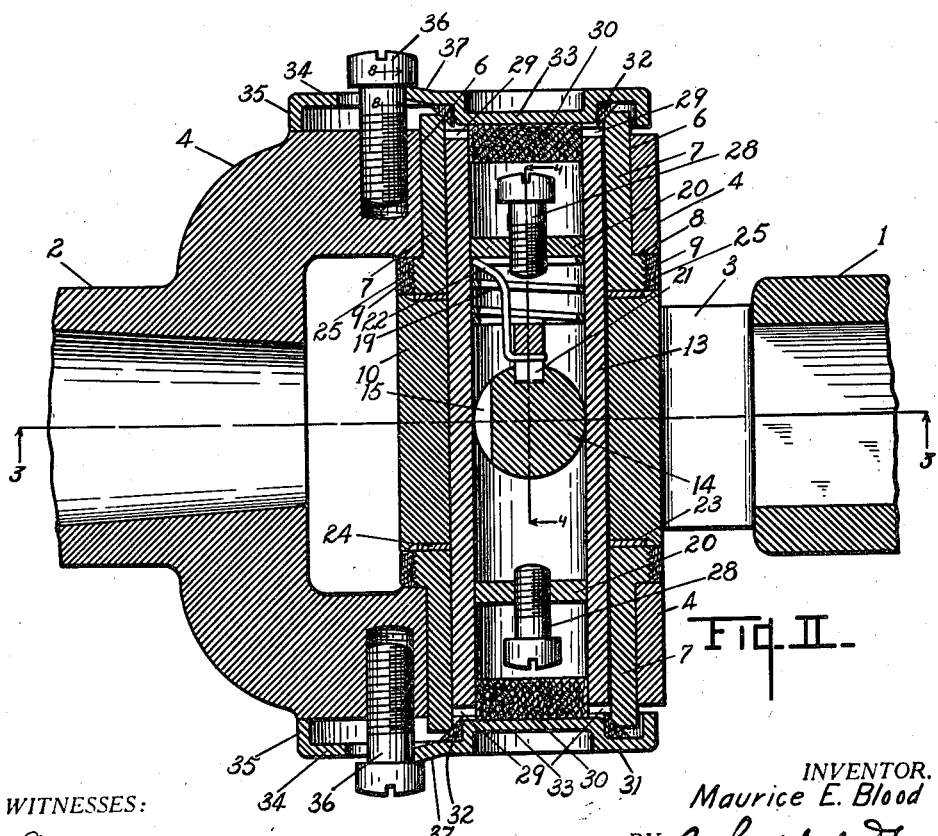
Fig. II.
WITNESSES:
Lenn Gilman
H. P. Sears
INVENTOR.
Maurice E. Blood
BY Chappell Earl
ATTORNEYS.

M. E. BLOOD.
UNIVERSAL JOINT.
APPLICATION FILED MAY 17, 1916.
1,216,769.
Patented Feb. 20, 1917.
2 SHEETS—SHEET 2.
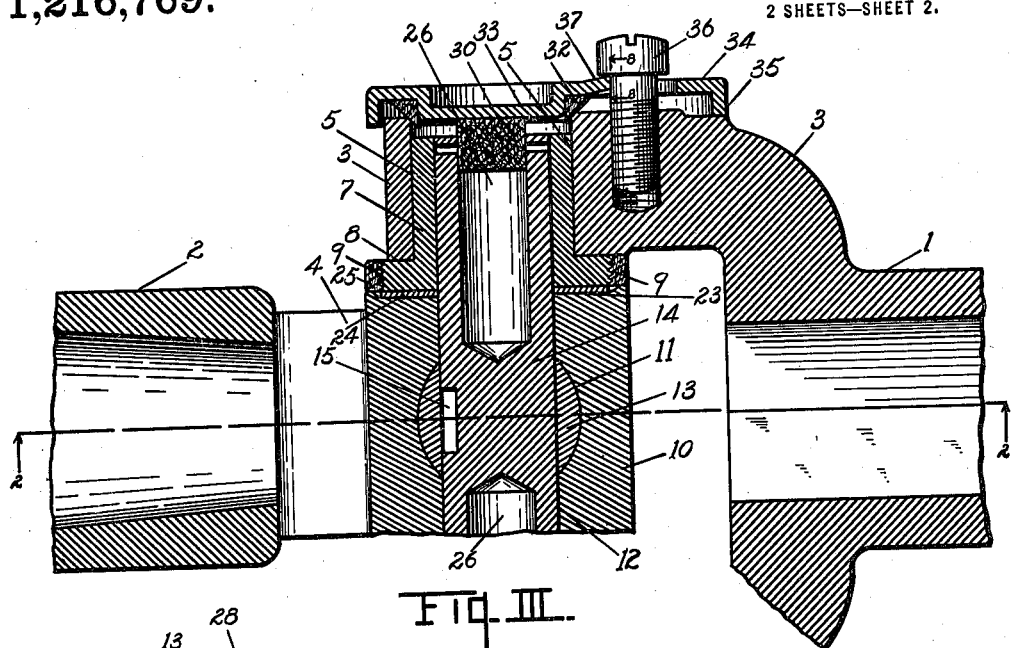
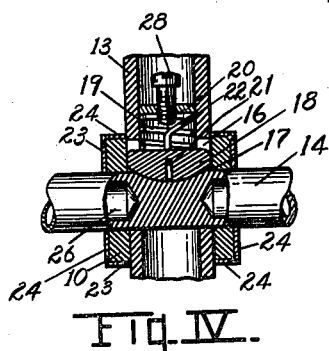
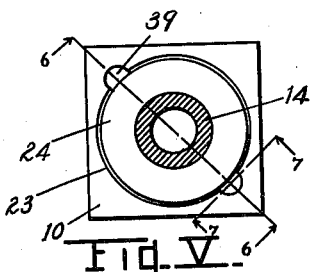
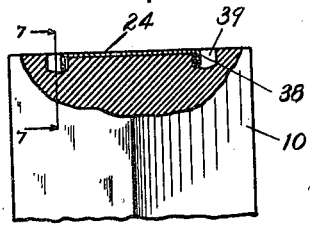
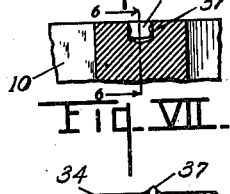
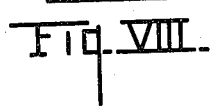
WITNESSES:
Lenn Gilman
H. G. Sears
INVENTOR.
Maurice E. Blood
BY Chappell & Earl
ATTORNEYS.

UNITED STATES PATENT OFFICE.

MAURICE E. BLOOD, OF KALAMAZOO, MICHIGAN, ASSIGNOR TO MARY L. BLOOD, OF KALAMAZOO, MICHIGAN.

UNIVERSAL JOINT.

1,216,769.      Specification of Letters Patent.      Patented Feb. 20, 1917.

Application filed May 17, 1916. Serial No. 98,071.

*To all whom it may concern:*

Be it known that I, MAURICE E. BLOOD, a citizen of the United States, residing at Kalamazoo, county of Kalamazoo, State of Michigan, have invented certain new and useful Improvements in Universal Joints, of which the following is a specification.

This invention relates to improvements in universal joints.

The main objects of my invention are:

First, to provide an improved universal joint of the journal pin type which is provided with effective lubricating means without the necessity of entirely incasing the joint.

Second, to provide an improved universal joint of the journal pin type which is comparatively simple and economical in structure and easily assembled.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side view of a universal joint embodying the feature of my invention.

Fig. II is a detail longitudinal section on a line corresponding to line 2—2 of Fig. III.

Fig. III is a detail longitudinal section on a line corresponding to line 3—3 of Figs. I and II.

Fig. IV is a detail section on a line corresponding to line 4—4 of Fig. II, showing the arrangement of the locking key for the smaller journal pin.

Fig. V is a side view of the journal member, one of the journal pins being shown in section and one of the bearing plates being shown in position.

Fig. VI is a detail view, partially in section, on a line corresponding to line 6—6 of Figs. V and VII.

Fig. VII is a detail section on a line corresponding to line 7—7 of Figs. V and VI.

Fig. VIII is a detail section on a line corresponding to line 8—8 of Fig. II, showing details of the closure cap.

In the drawing similar reference characters refer to similar parts throughout the several views, and the sectional views are taken looking in the direction of the little arrows at the ends of the section lines.

Referring to the drawing, the shaft members 1 and 2 are provided with forks 3 and 4, respectively, having journal pin bearing openings 5 and 6, the parts being substantially the same except that the bearing openings 6 are somewhat larger than the bearing openings 5 and the members are adapted to receive differently shaped shaft members. Bushings 7 shouldered at 8 are arranged in the bearing openings of the shaft members so that the shoulders 8 engage the inner sides of the arms. The inner ends of the bushings are threaded at 9.

The journal member 10 is provided with journal pin openings 11 and 12 disposed at right angles to each other. The diameter of the opening 11 is substantially greater than of the opening 12. The journal pins 13 and 14 are arranged in these openings, the larger pin 13 being tubular and provided with a transverse hole 15 registering with the hole 12 of the journal block or member 10. The pin 13 is arranged in the hole 11 with the hole 15 thereof registering with the hole 12. The smaller pin 14 is then inserted through the journal pin and constitutes a locking member therefor. The larger journal pin is also provided with a transverse key slot 16 opening into the hole 15, while the smaller pin 14 is provided with a curved key seat 17 registering with the key slot 16.

The key 18 is disposed in the slot 16 to engage the key seat 17 of the smaller pin, being held to its seat by the coiled spring 19 arranged within the pin 13, the spring being supported by one of the partitions 20. The key is provided with a slot 21 and the outer end of the spring 19 terminates in an arm 22 engaging this slot (see Fig. IV), thereby retaining the key in place when the pins are disassembled. This arrangement of the key serves to hold the smaller pin in position and the smaller pin constitutes a key or locking pin for the larger pin. At the same time, the smaller pin may be readily driven out in the event it is desired to disassemble, and it is automatically engaged by the key in assembling the parts.

The journal member is provided with seats 23 for the bearing plates 24, which are in the shape of washers embracing the journal pins. These bearing plates are supported to coact with the inner ends of the bushings. With this arrangement of parts all the wearing or bearing parts can be renewed as required.

To exclude dust and retain the lubricant the packing members 25 are threaded onto the inner ends of the bushings to coact with the journal member. The larger pin being tubular constitutes a lubricant chamber while the smaller pin is provided with lubricant chambers 26 in the form of bores extending from each end. It will be appreciated that the lubricant chamber for the smaller pin may extend from end to end.

The pin 13 is preferably provided with partitions 20 spaced from its ends thereby providing a central lubricant chamber and end chambers, one of these partitions constituting a support for the spring 19. The partitions are provided with closure plugs 28. Lubricant passages 29 are provided and disposed so that they open to the bushings, thus providing a direct passage for the lubricant to the bushings. These passages are, however, preferably covered by the closure plugs 30 of fibrous material, such as felt, which permit the passage of lubricant but prevent its excessive flow to the bearing surfaces.

The closure caps 31 are adapted to engage these closure plugs and are also provided with gaskets 32, the gaskets of one pair of closure caps being adapted to engage the ends of the bushings for the tubular pin, while the other pair are adapted to engage the edges of the bushing openings, the object being to provide caps which fit in any of the four positions. These caps have central depressed portions 33 around which the gaskets fit. The caps are provided with arms or extensions 34 having flange-like portions 35 at their outer ends adapted to rest on the shaft members.

The clamping screws 36 are arranged through these extensions to clamp the caps in place, and the extensions are preferably provided with struck up portions 37 with which the screws engage and which serve the purpose of spring washers for retaining the screws in their adjusted positions.

The bearing plates 24 are preferably provided with tongues or lugs 38 which fit into holes 39 in the bearing block thereby preventing rotation of the bearing plates and the lugs are so shaped as to constitute retaining members.

With the parts thus arranged, the lubricant chambers are filled with lubricant which is gradually fed to the bearings so that they are effectively lubricated, the lubricant passing from the outer ends of the lubricant chambers to the bearings and also from the central lubricant chamber of the larger pin.

In the structure shown the smaller pin is of substantially the internal diameter of the greater pin and to permit the passage of lubricant from one side to the other of the smaller pin a slot 39' is formed therein (see Fig. III).

The parts of my improved joint are so formed and assembled that they are very economical to produce and assemble, either in the factory or in the shop, as occasion requires and, as stated, the bearing parts are effectively lubricated and protected from dirt without the necessity of providing an inclosing casing.

I have not illustrated or described certain modifications which I contemplate as I believe the disclosure made will enable those skilled in the art to which my invention relates to embody or adapt my improvements as conditions may dictate.

Having thus described my invention, what I claim as new and desire to secure by Letters Patent, is:

1. The combination of shaft members having arms provided with journal pin bearing openings, journal bushings shouldered and externally threaded at their inner ends disposed in said bearing openings with their shoulders engaging the inner sides of the arms, a journal member provided with journal pin openings disposed at right angles to each other, the diameter of one of said openings exceeding that of the other, said journal member being provided with bearing plate seats about said openings, bearing plates disposed in said seats to coact with the inner ends of said bushings, packing members threaded upon the inner ends of said bushings to coact with said journal member, journal pins disposed in said journal pin openings of said journal pin member, the larger pin being tubular and constituting a lubricant chamber and being provided with a transverse hole registering with the smaller pin opening of said journal member, the smaller pin being disposed through said hole and provided with lubricant chambers, there being lubricant passages in said journal pins opening to said bushings, and closures for said lubricant chambers comprising caps and fibrous plugs disposed to cover said lubricant passages.

2. The combination of shaft members having arms provided with journal pin bearing openings, journal bushings shouldered at their inner ends disposed in said bearing openings with their shoulders engaging the inner sides of the arms, a journal member provided with journal pin openings disposed at right angles to each other, the diameter of one of said openings exceeding that of the other, journal pins disposed in said journal pin openings of said journal pin member, the larger pin being tubular and constituting a lubricant chamber and being provided with a transverse hole registering with the smaller pin opening of said journal member, the smaller pin being disposed through said hole and provided with lubricant chambers, there being lubricant passages in said journal pins opening to said bushings, and closures for said lubricant chambers comprising caps and fibrous plugs disposed to cover said lubricant passages.

3. The combination of shaft members having arms provided with journal pin bearing openings, journal bushings shouldered and externally threaded at their inner ends disposed in said bearing openings with their shoulders engaging the inner sides of the arms, a journal member provided with journal pin openings disposed at right angles to each other, the diameter of one of said openings exceeding that of the other, said journal member being provided with bearing plate seats about said openings, bearing plates disposed in said seats to coact with the inner ends of said bushings, packing members threaded upon the inner ends of said bushings to coact with said journal member, journal pins disposed in said journal pin openings of said journal pin member, the larger pin being tubular and constituting a lubricant chamber and being provided with a transverse hole registering with the smaller pin opening of said journal member; the smaller pin being disposed through said hole and provided with lubricant chambers, and closures for said lubricant chambers.

4. The combination of shaft members having arms provided with journal pin bearing openings, journal bushings shouldered at their inner ends disposed in said bearing openings with their shoulders engaging the inner sides of the arms, a journal member provided with journal pin openings disposed at right angles to each other, the diameter of one of said openings exceeding that of the other, journal pins disposed in said journal pin openings of said journal pin member, the larger pin being tubular and constituting a lubricant chamber and being provided with a transverse hole registering with the smaller pin opening of said journal member, the smaller pin being disposed through said hole and provided with lubricant chambers, and closures for said lubricant chambers.

5. The combination of shaft members provided with journal pin bearing openings, journal bushings disposed in said bearing openings, a journal member provided with journal pin openings disposed at right angles to each other, the diameter of one of said openings exceeding that of the other, said journal member being provided with bearing plate seats about said openings, bearing plates disposed in said seats to coact with the inner ends of said bushings, packing members mounted upon the inner ends of said bushings to coact with said journal member, journal pins disposed in said journal pin openings of said journal pin member, the larger pin being tubular and constituting a lubricant chamber and being provided with a transverse hole registering with the smaller pin opening of said journal member, the smaller pin being disposed through said hole and provided with lubricant chambers, and closures for said lubricant chambers.

6. The combination of shaft members provided with journal pin bearing openings, journal bushings disposed in said bearing openings, a journal member provided with journal pin openings disposed at right angles to each other, the diameter of one of said openings exceeding that of the other, packing members mounted upon the inner ends of said bushings to coact with said journal member, journal pins disposed in said journal pin openings of said journal pin member, the larger pin being tubular and constituting a lubricant chamber and being provided with a transverse hole registering with the smaller pin opening of said journal member, the smaller pin being disposed through said hole and provided with lubricant chambers, and closures for said lubricant chambers.

7. The combination of shaft members provided with journal pin bearing openings, journal bushings disposed in said bearing openings, a journal member provided with journal pin openings disposed at right angles to each other, the diameter of one of said openings exceeding that of the other, said journal member being provided with bearing plate seats about said openings, bearing plates disposed in said seats to coact with the inner ends of said bushings, journal pins disposed in said journal pin openings of said journal pin member, the larger pin being tubular and constituting a lubricant chamber and being provided with a transverse hole registering with the smaller pin opening of said journal member, the smaller pin being disposed through said hole and provided with lubricant chambers, and closures for said lubricant chambers.

8. The combination of shaft members provided with journal pin bearing openings, journal bushings disposed in said bearing openings, a journal member provided with journal pin openings disposed at right angles to each other, the diameter of one of said openings exceeding that of the other, journal pins disposed in said journal pin openings of said journal pin member, the larger pin being tubular and provided with a transverse hole registering with the smaller pin opening of said journal member, the smaller pin being disposed through said hole, said pins being provided with lubricant chambers, there being lubricant passages in said journal pins opening to said bushings, and closures for said lubricant chambers comprising caps and fibrous plugs disposed to cover said lubricant passages.

9. The combination of shaft members provided with journal pin bearing openings, journal bushings disposed in said bearing openings, a journal member provided with journal pin openings disposed at right angles to each other, the diameter of one of said openings exceeding that of the other, journal pins disposed in said journal pin openings of said journal pin member, the larger pin being tubular and provided with a transverse hole registering with the smaller pin opening of said journal member, the smaller pin being disposed through said hole, said pins being provided with lubricant chambers, and closures for said lubricant chambers mounted on said shaft members.

10. The combination of shaft members provided with journal pin bearing openings, journal bushings disposed in said bearing openings, a journal member provided with openings, journal pin openings disposed at right angles to each other, the diameter of one of said openings exceeding that of the other, journal pins disposed in said journal pin openings of said journal pin member, the larger pin being tubular and constituting a lubricant chamber and being provided with a transverse hole registering with the smaller pin opening of said journal member, the smaller pin being disposed through said hole and provided with lubricant chambers, closures for said lubricant chambers, and partitions disposed in said tubular pin in a spaced relation to the ends thereof, at least one of said partitions being provided with a removable closure plug.

11. The combination of shaft members having arms provided with journal pin bearing openings, journal bushings shouldered and externally threaded at their inner ends disposed in said bearing openings with their shoulders engaging the inner sides of the arms, a journal member provided with journal pin openings disposed at right angles to each other, the diameter of one of said openings exceeding that of the other, packing members threaded upon the inner ends of said bushings to coact with said journal member, and journal pins disposed in said journal pin openings of said journal pin member, the larger pin being provided with a transverse hole registering with the smaller pin opening of said journal member, the smaller pin being disposed through said hole.

12. The combination of shaft members provided with journal pin bearing openings, journal bushings disposed in said bearing openings, a journal member provided with journal pin openings disposed at right angles to each other, the diameter of one of said openings exceeding that of the other, said openings exceeding that of the other, journal pins disposed in said journal pin openings of said journal pin member, the larger pin being provided with a transverse hole registering with the smaller pin opening of said journal member, the smaller pin being disposed through said hole, said pins having lubricant chambers therein, there being lubricant passages in said journal pin openings to said bushings, closures for said lubricant chambers comprising plugs of fibrous material disposed to cover said lubricant passages, caps engaging said closure plugs and provided with gaskets, the gaskets of one pair of caps being adapted to coact with the ends of the bushings for the larger journal pin, the gaskets for the other being adapted to coact with the edges of the bearing openings for the other journal pin, said caps having extensions at one side resting on the shaft members, and screws arranged through said extensions for clamping said caps in position.

13. The combination of shaft members provided with journal pin bearing openings, journal bushings disposed in said bearing openings, a journal member provided with openings, a journal member provided with journal pin openings disposed at right angles to each other, the diameter of one of said openings exceeding that of the other, journal pins disposed in said journal pin openings of said journal pin member, the larger pin being provided with a transverse hole registering with the smaller pin opening of said journal member, the smaller pin being disposed through said hole, said pins having lubricant chambers therein, closure caps provided with gaskets, the gaskets of one pair of caps being adapted to coact with the ends of the bushings for the larger journal pin, the gaskets for the other being adapted to coact with the edges of the bearing openings for the other journal pin, said caps having extensions at one side resting on the shaft members, and screws arranged through said extensions for clamping said caps in position.

14. The combination of shaft members provided with journal pin bearing openings, journal bushings disposed in said bearing openings, a journal member provided with journal pin openings disposed at right angles to each other, the diameter of one of said openings exceeding that of the other, journal pins disposed in said journal pin openings of said journal pin member, the larger pin being provided with a transverse hole registering with the smaller pin opening of said journal member, the smaller pin being disposed through said hole, said pins being disposed through said hole, said pins having lubricant chambers therein, closure caps for said chambers, said caps having extensions at one side resting on said shaft members, and screws arranged through said extensions for clamping said caps in position, said extensions having struck up portions with which said screws engage.

15. The combination of shaft members provided with journal pin bearing openings, journal bushings disposed in said bearing openings, a journal member provided with journal pin openings disposed at right angles to each other, the diameter of one of said openings exceeding that of the other, journal pins disposed in said journal pin openings of said journal pin member, the larger pin being provided with a transverse hole registering with the smaller pin opening of said journal member, the smaller pin being disposed through said hole, said pins having lubricant chambers therein, closure caps for said chambers, said caps having extensions at one side resting on said shaft members, and screws arranged through said extensions for clamping said caps in position.

16. The combination of shaft members provided with journal pin bearing openings, a journal member provided with journal pin openings disposed at right angles to each other, the diameter of one of said openings exceeding that of the other, journal pins disposed in said journal pin openings of said journal pin member, the larger pin being tubular and provided with a transverse hole and a key slot opening into said hole, said hole registering with the smaller pin opening of said journal member, the smaller pin being disposed through said hole and provided with a curved key seat alined with said key slot, a key disposed in said key slot having a curved face engaging said key seat, said key having a transverse slot therein, and a coiled spring arranged within said tubular journal pin to urge said key to its seat, the outer end of said spring terminating in an arm engaging said slot in said key.

17. The combination of shaft members provided with journal pin bearing openings, a journal member provided with journal pin openings disposed at right angles to each other, the diameter of one of said openings exceeding that of the other, journal pins disposed in said journal pin openings of said journal pin member, the larger pin being tubular and provided with a transverse hole and a key slot opening into said hole, said hole registering with the smaller pin opening of said journal member, the smaller pin being disposed through said hole and provided with a curved key seat alined with said key slot, a key disposed in said key slot having a curved face engaging said key seat, and a spring arranged within said tubular journal pin to urge said key to its seat.

18. The combination of shaft members provided with journal pin bearing openings, a journal member provided with journal pin openings disposed at right angles to each other, the diameter of one of said openings exceeding that of the other, journal pins disposed in said journal pin openings of said journal pin member, the larger pin being tubular and provided with a transverse hole and a key slot opening into said hole, said hole registering with the smaller pin opening of said journal member, the smaller pin being disposed through said hole and provided with a key seat alined with said key slot, a key disposed in said key slot engaging said key seat, and a spring arranged within said tubular journal pin to urge said key to its seat.

In witness whereof, I have hereunto set my hand and seal in the presence of two witnesses.

MAURICE E. BLOOD. [L. S.]

Witnesses:
 LUELLA G. GREENFIELD,
 ANNIE E. PARRY.